Dec. 31, 1940.   T. H. GILL   2,227,253
AUTOMATIC GAS CAP AND HOOD LOCKING DEVICE
Filed Sept. 13, 1938   3 Sheets-Sheet 1
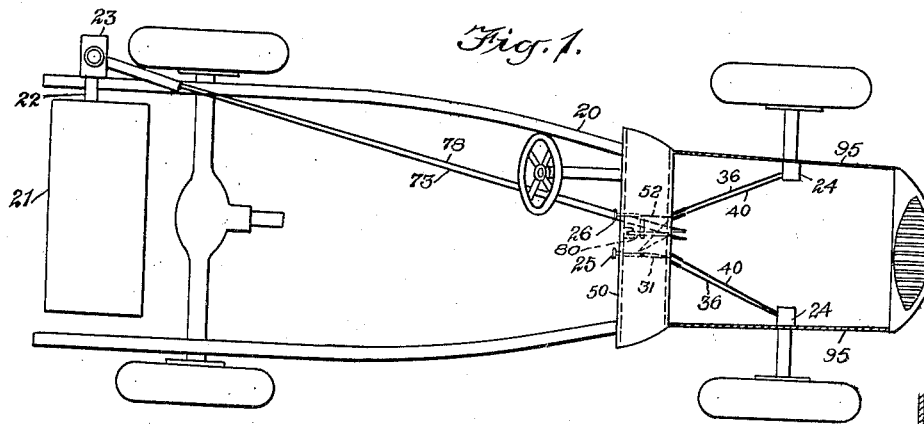
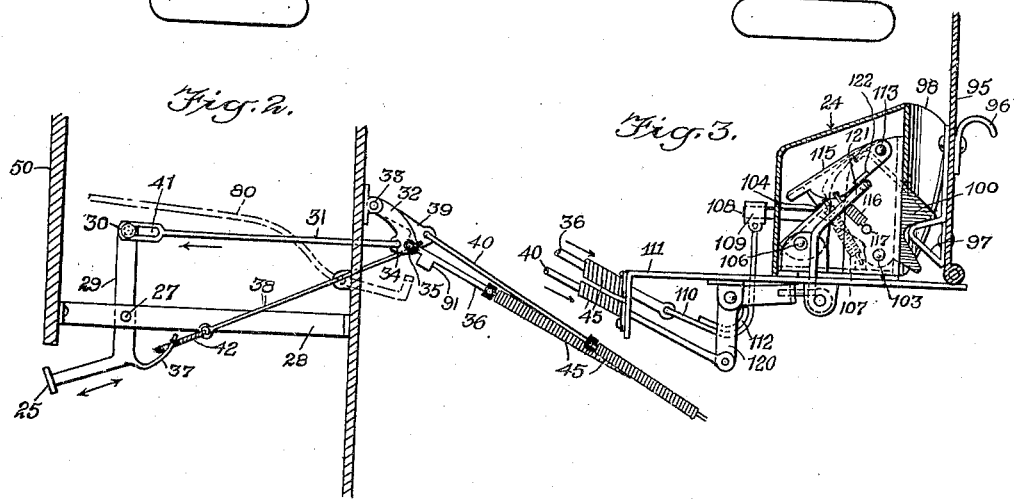
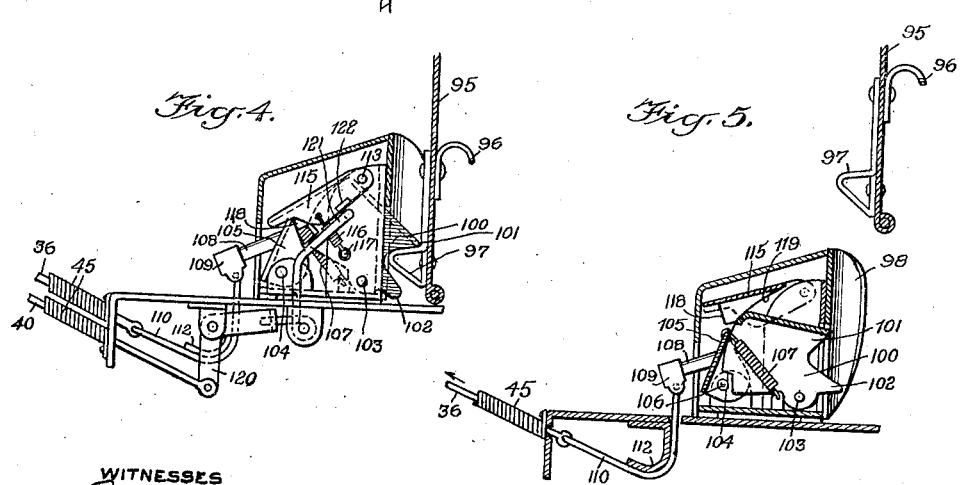
WITNESSES
INVENTOR
Thomas Howard Gill
BY
ATTORNEYS

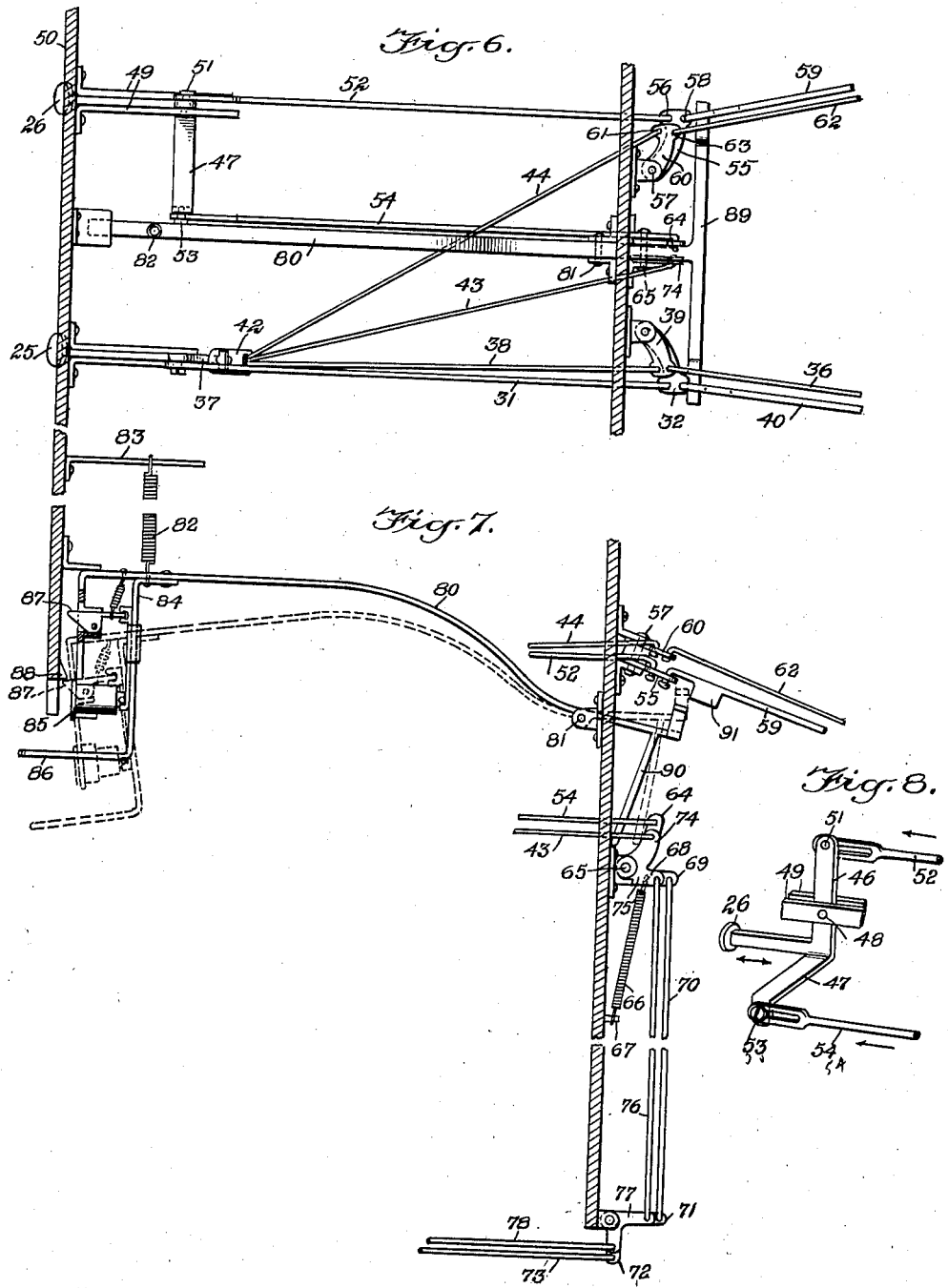

Dec. 31, 1940.  T. H. GILL  2,227,253
AUTOMATIC GAS CAP AND HOOD LOCKING DEVICE
Filed Sept. 13, 1938  3 Sheets-Sheet 3
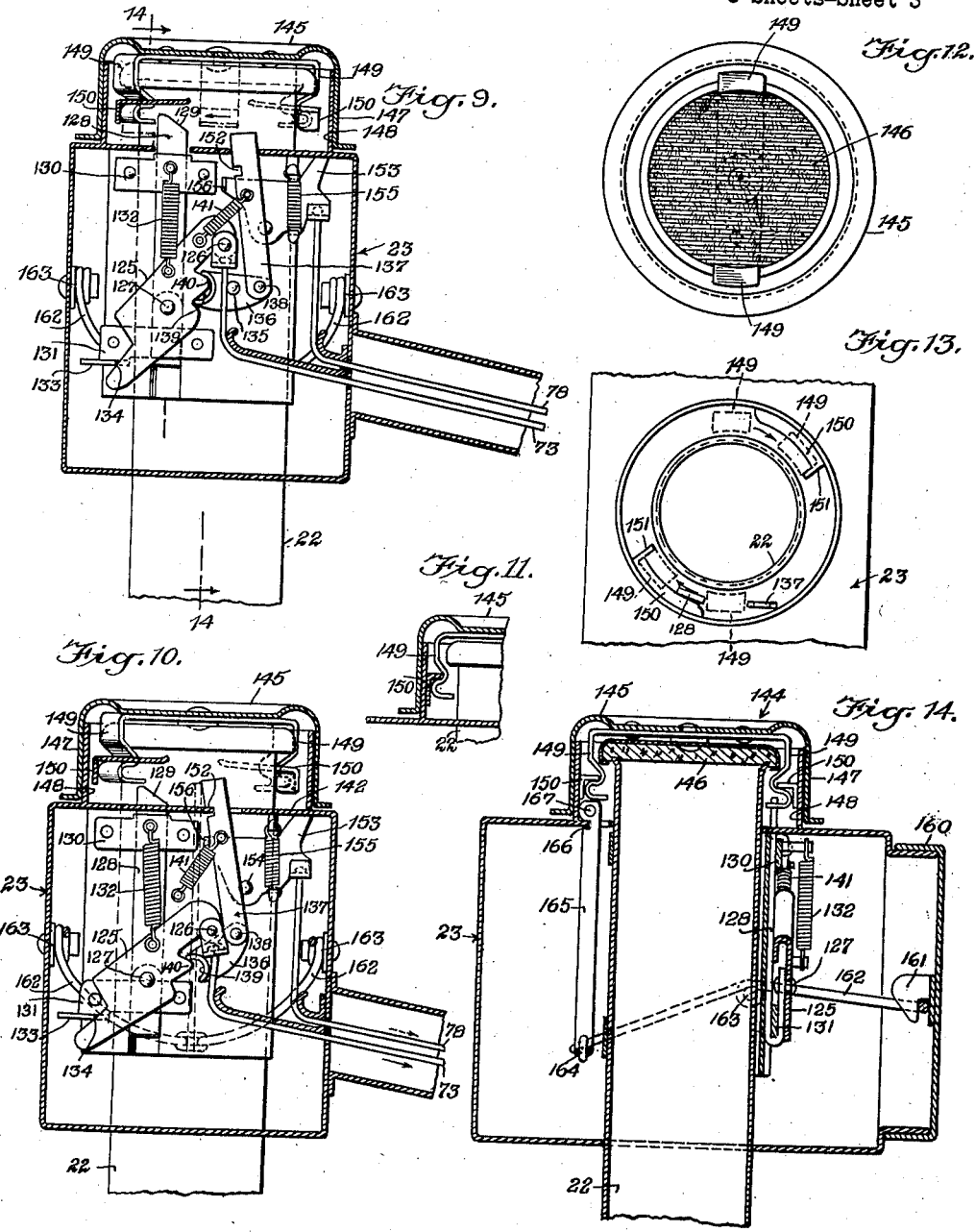
INVENTOR
Thomas Howard Gill Patented Dec. 31, 1940

2,227,253

UNITED STATES PATENT OFFICE 2,227,253

AUTOMATIC GAS CAP AND HOOD LOCKING DEVICE

Thomas Howard Gill, Brooklyn, N. Y.

Application September 13, 1938, Serial No. 229,795

4 Claims. (Cl. 70—264)

This invention relates to automobile locks and more particularly to locks to protect the hood and gas tank of automobiles and similar vehicles.

An object of this invention is to provide a system whereby locks on the gas tank and hood of an automobile may be controlled from the driver's seat.

A further object is to provide a system whereby such locks may be operated selectively and whereby the locks may be opened or closed at the driver's election.

A further object is to provide a system whereby such locks will operate automatically to seal the hood and gas tank and thus to prevent tampering with the motor or gasoline.

It is common knowledge that when parked on the street or in unreliable garages automobiles are subject to thievery and improper tampering, and that many times gasoline is siphoned from a car or the motor tampered with, thus requiring the expenditure of large amounts of money by the owner.

A further object of this invention is to devise a system whereby not only is the hood and gas tank cover locked, but the means of opening and controlling such locks is protected from the driver's seat.

In the accompanying drawings—

Fig. 1 represents a plan view showing my invention installed in a conventional car;

Fig. 2 is a cross sectional view of the instrument panel and dash board showing one of the operating handles mounted thereon;

Fig. 3 is a cross sectional view of the hood lock with the lock closed;

Fig. 4 is a similar view to Fig. 3 with the catch unlatched;

Fig. 5 is a similar view showing the hood in open position;

Fig. 6 is a plan view in section of the instrument panel and dashboard;

Fig. 7 is a cross sectional view of the same area;

Fig. 8 is a view of one of the operating handles;

Fig. 9 is a cross sectional view of the gas tank cap lock with the lock in closed position;

Fig. 10 is a similar view with the lock in open position;

Fig. 11 is a sectional view showing the construction of the cap;

Fig. 12 is a plan view showing the inner construction of said cap from the bottom;

Fig. 13 is a view showing the construction of the cap with relation to the operating mechanism of the lock;

Fig. 14 is a cross sectional view taken on the line 14—14 of Fig. 9.

Referring more particularly to the drawings, Fig. 1 shows my apparatus set up in a conventionl chassis 20 with the conventional gas tank 21. The gas tank pipe 22 is provided with a lock 23 and the hoods are provided with locks 24 identical in operation.

The instrument board is provided with operating handles 25 and 26. The handle 25 is pivoted at 27 to the bar 28 running from the instrument board to the dashboard. The pivotal point 27 is on an upwardly extending portion 29 of the handle 25. From the upper end 30 of the handle 25 a cable or rod 31 extends forwardly to communicate with one end of a pivoted arm 32. The arm 32 is pivoted to the dashboard at 33 and at its other end 34 to the rod 31. The arm 32 is likewise pivoted at 35 to another rod 36. On the lower end of the operating handle 25 there is pivoted at 37 another rod 38 which communicates with a second arm 39, which arm 39 is likewise pivoted at 33 and communicates with a cable 40.

The operation of the rod 31 which communicates with the operating handle 25 at 30 is provided with a loop 41 and a similar loop or link 42 is provided on the end of the rod 38, and it will be seen that by the movement of the operating handle 25 in a direction toward the operator a pull will be exerted upon the rod 38 and the cable 40, while the operation of the arm in the opposite direction will exert a pull upon the rod 31 and the cable 36.

In actual operation three rods—43 and 44 as well as the rod 38 previously discussed—are fastened to the lower portion of the operating handle 25 at 37, as will be apparent from Fig. 6. These rods operate a master locking system and in the operation shown in the drawings the movement of the operating handle 25 to the rear toward the operator will cause all locks to lock, while the movement forwardly will cause the opening of the hood lock 24 on the righthand side of the car. Both of the cables 40 and 36 are provided with springs 45 exerting pressure against the operation of the handle so that upon its release it will return to its neutral position.

The operating handle 26 has an upwardly extending portion 46 and a laterally extending portion 47. The operating handle 26 is pivoted through its upwardly extending portion 46 at 48 to two arms 49 extending from the instrument board 50. Linked to the upper end of the member 46 at 51 is a rod 52, and linked to the laterally extending member 47 at 53 is another rod 54. The rod 52 extends to a pivoted arm 55 and is pivoted thereto at 56. The arm 55 is pivoted to the dashboard at 57 and operates therefrom. Also pivoted to the arm 55 at 58 is a cable 59 which runs to the left hood lock 24 and acts to open said lock in the same way as the cable 36 on the opposite lock. Also pivoted at 57 is an arm 60 which connects at its outer end with the rod 44 at 61. Another cable 62 connects with the arm 60 at 63 to lock the hood lock 24. Attached to the lateral arm 47 is a rod 54 which extends to a bell crank lever 64 which is pivoted at 65 to the dashboard. A spring 66 fastened at 67 to the bell crank lever 64 at 68 operates against the movement of the rod 54. From the other arm 69 of the bell crank lever 64 a rod 70 communicates with another bell crank lever 71. The opposite arm 72 of the bell crank lever 71 communicates with a cable 73 extending to the gas tank cap lock 23 and operates to unlock said lock. The rod 43 extends through the dashboard to a bell crank lever 74 pivoted at 65, the opposite end of which 75 communicates with the rod 76 and an additional bell crank lever 77 to operate the cable 78 which is a control cable to lock the gas tank cap lock 23.

It will be seen that the operation of the left handle 26 in an inwardly direction toward the operator will exert a pull on the rod 52 and in turn on the cable 59 to unlock the lefthand hood lock 24, while pressure in the opposite direction will unlock the gas tank cap lock 23.

It will be further seen that while movement of the operating handle 25 inwardly operates the righthand hood lock to open, movement of the operating handle 25 outwardly will operate the rods 38, 43 and 44 to exert a pull on the cables 62, 36 and 78.

In order to prevent tampering with the levers 25 and 26, a locking mechanism of any suitable nature may be provided. I have provided a spring rod 80 which is pivoted to the dashboard at 81 and suspended by a spring 82 supported from the instrument panel by the arm 83 communicating with the member 80 at 84. A conventional cylinder lock 85 is provided and an operating arm 86. The lock is provided with a latch 87 which is adapted to cooperate with a corresponding member 88 on the instrument board. When the operating arm 86 is pulled downwardly the latch 87 cooperates with the member 88 to hold it in the downward position. While I have shown a conventional lock for this purpose, it will be appreciated that any suitable lock may be used to maintain the downward position of the handle 86 and the bar 80. The movement of the member 80 into a downward position causes the bar 89 on the opposite end of the member 80 to move upwardly and a rod 90 to move outwardly against the bell crank members 64 and 74.

The cables 40 and 59 are provided with shoulders similar to the shoulder 91 shown on the cable 59. As the bar 89 is moved upwardly it will engage the shoulder 91 and thus prevent pressure being exerted on the cable 59. Similarly, the bar 90 will prevent the movement of the bell crank lever 64 and effective operation of the handles 25 and 26 will be prevented.

Referring more particularly to the locks themselves and their operation by the cables, Fig. 3 shows the hood lock 24 adapted to lock the hood panel 95. The hood panel 95 is provided with a conventional handle 96 and a latch member 97. The lock includes a guiding shield 98 and a latch 100 having an upper tongue 101 and a lower tongue 102. The latch is pivoted at 103 and has on its rear face a cut-out shoulder 104 adapted to engage the catch 105. The catch 105 is pivoted at 106 and a spring 107 exerts forward and downward pressure to hold it against the shoulder 104. On the latch 105 is an arm 108, the outer end of which communicates with the cable 36 by means of the collar 109, or any other suitable fastener, and by means of the extension 110 on the cable 36.

I have found that it is preferable to bring the cable 36 down to and under the plate 111 on which the lock is mounted, bringing it around the shoulder 112 so that it will exert a downward pull on the catch arm 108.

Pivoted at 113 to the frame of the lock 114 is a trip lever 115 which is held in place by the spring 116 fastened at 117 to the frame of the lock 114. The trip lever 115 has a shoulder 118 adapted to engage the edge of the catch 105. When the arm 108 is moved downwardly, as shown in Fig. 4, this will allow the latch 100 to pivot backwardly at 103. When the hood is raised the latch member 97 exerts pressure against the lip 101 to so position the lock.

The trip lever 115 is provided with a cam surface 119 which operates against the back of the latch member, as shown in Fig. 5, so that when the latch member 100 is moved backwardly on its pivot 103, the cam surface 119 is engaged and the shoulder 118 is moved out of engagement with the catch 105. The spring 107 will then move the catch 105 forwardly so that when the latch member 100 is pivoted into locked position by pressure on the lip 102 caused by the latch member 97 when the hood is closed, the catch 105 will spring forwardly into engagement with the shoulder 104 of the latch member 100.

It will be seen that the lock is operated by pressure on the lever 25 as previously discussed, causing a pull on the cable 36 which in turn lowers the arm 108. The hood may then be opened and the latch member 100 will be pivoted upon the opening, releasing the trip lever 115 and allowing the catch member 105 to move forward. When the hood is replaced, pressure of the latch member 97 on the lower lip 102 will cause the lock to operate and return to its normal locked position. In the event that the lock is inadvertently opened, the use of the master control which will exert pressure on the cable 40 and in turn on the bellcrank lever 120 to operate the member 121 which will contact the shoulder 122 of the trip latch 115, freeing the catch member 105 and allowing it to move backwardly in engagement with the shoulder 104. The lock on the opposite side of the hood operates in the same manner, and it will be seen that either lock may be opened at will.

As previously stated, the cables 73 and 78 extend rearwardly to the gasoline tank cap lock, cable 73 operating to open said lock and cable 78 acting as a master control to close said lock. (Pressure is exerted on the cable 73 by the movement of the handle 26 forwardly.) The cable 73 is pivoted to an arm 125 at 126. The arm 125 is pivoted at 127 to a catch 128. The catch 128 has a cammed surface 129 and operates upwardly and downwardly between the guide members 130 and 131. A spring 132, fastened at one end to the guide member 130 and at the other to the arm 125, tends to pull the catch 128 upwardly into an operative position. On the guide 131 is a stop 133 which engages a shoulder 134 of the arm 125 to guide its movement.

Pivoted to the gas tank pipe 22 at 135 is a swivel member 136. An arm 137 is pivoted to one end of the swivel at 138 and a concave surface 139 is provided at the opposite end of the swivel member 136. The concave surface 139 is adapted to engage a shoulder 140 on the arm 125. In addition, a spring 141 connects the arm 125 and the arm 137 to control their relative movements. When pressure is exerted on the cable 73 by the operation of the handle 25 rearwardly, the cable pulls the arm 125 downwardly and clockwise against the spring 132 causing the swivel member 136 to push the arm 137 upwardly through the face 142 of the lock, as shown in Fig. 10. This causes the catch 128 to move downwardly through the guide members 130 and 131.

The gasoline tank cap 144 is provided with an outer face 145 and an inner pivotal cap of cork, rubber, or other suitable material 146. A downwardly extending rim 147 closely cooperates with the upwardly extending flange 148 of the case of the lock. Fastened to the inner side of the outer facing 145 of the cap 144 is a plate 149 extending around the member 146 and so shaped as to cooperate with right angular members 150 on the inner surface of the flange 148 so that when the lower ends of the member 149 are in contact with the members 150 the cap may not be removed. Stops 151 are provided to limit the turning of the cap so that when the lower end of the members 149 are brought into engagement with the members 150 the turning of the cap will be restricted.

From an examination of Fig. 10, it will be apparent that when the latch member 128 is pulled downwardly by pressure on the cable 73, the cap may be turned and the member 149 will not contact the latch member 128. On the other hand, when the latch member 128 is in an upward position, as shown in Fig. 9, movement will be prevented by said latch member. Similarly, when the latch member 128 is in an operative position, the arm 137 is down within the lock 23 and will not contact the members 149 when the cap is put on. Due to the beveled or cammed face 129, the cap may be put in place when the latch 128 is in an operative position, and it will slide downwardly against the spring 132 to allow the cap to pass over.

After the cable 73 has been pulled and the arm 125 brought downwardly and pivoted, it will be noted that the arm 137 is in an upward position. This arm is provided with a cutout portion 152 which is adapted to engage the face 142 of the lock when the arm 139 is in an upward position. As the cap is removed, the members 150 of the cap will release the arm 137 and it will be drawn downwardly by the spring 141, at the same time allowing the arm 125 and the catch 128 to be returned to operative position by pressure of the spring 132.

After the lock has been opened by pressure on the cable 73 it may be desired to lock the same without removing the cap 144 by operation of the master control lever—that is, by pulling the handle 25 rearwardly, pressure will be brought to bear on the cable 78. The cable 78 is fastened to a plate 153 which is pivoted at 154 and held in an inoperative position by the spring 155 running between the face 142 of the lock and the bottom of the plate 153. The plate 153 is provided with a shoulder 156 which, when the plate 153 is pivoted due to pressure by the cable 78, contacts the arm 137 and disengages the cutout portion 152 from the face 142 of the lock allowing the arm 137 to move downwardly and the lock to lock.

In order that repairs may be made to the lock from time to time, I provide a door 160 at one end thereof having a hook catch 161. This catch engages a bar 162 which is pivoted to the case of the lock 23 at 163 and engages at its far end 164 an arm 165. The arm 165 extends upwardly through the face of the lock and has a cutout portion 166 to engage the face 142 of the lock to maintain it in position.

I also provide a hole 167 in the arm 165, and, when the cap is removed, by inserting a tool through the hole 167 the arm 165 may be disengaged from the face 142 of the lock, pulled upwardly, thus freeing the door 160 and providing a means for repairing or oiling the lock. It will be noted that this provides the only means for getting at the working mechanism of the lock.

It will be apparent from an examination of the drawings and the description herein, that I have provided a means for the protection of the engine and gas tank of an automobile which may be easily and simply operated from the instrument board of the car. All of the locks are automatic in their operation so that when the hood and gas tank cap are placed in their respective positions they immediately lock. The operator may selectively decide which lock he desires to unlock and may lock all of the locks with a single operation.

I claim:

1. The combination with an automobile having an instrument panel, gas tank and hood covers, of a lock system, said system comprising separate hood and gas cap locks, all of said locks being automatic in their locking operation, operating handles on said instrument board, cables and connecting rods connecting the mechanism of said locks with said operating handles, whereby the movement of one of said handles in one direction will cause tension upon the cable operating said gas tank lock to unlock said lock, and the movement of said handle in the other direction will cause tension on the cable operating one of said hood locks to open said lock, and whereby the operation of the other handle in one direction will cause tension upon the cable opening the other hood lock, while the operation of said handle in the opposite direction will cause tension upon cables communicating with all of said locks to cause all of said locks to close.

2. The combination with an automobile having an instrument panel, gas tank and hood covers, of a lock system, said lock system comprising separate hood and gas cap locks, operating handles on said instrument panel, cables and rods connecting the opening mechanism of each of said locks with said operating handles and cables connecting the closing mechanism of said locks with one of said operating handles, whereby the selective movement of said operating handles may open each of said locks or close all of said locks, and an additional lock member adapted to engage said cables and rods to prevent the operation thereof.

3. The combination with an automobile having an instrument panel, gas tank and hood covers, of a lock system, said lock system comprising separate hood and gas cap locks, cables operatively connected with the opening mechanism of each of said locks and additional cables operatively connected with the closing mechanism of each of said locks, lever means on said instrument panel for selectively causing tension on each of said first-mentioned cables to open any of said locks, and for causing tension on all of said second-mentioned cables to close or open the locks.

4. The combination with an automobile having an instrument panel, gas tank and hood covers, of a lock system, said system comprising separate hood and gas cap locks, opening and closing mechanism on each of said locks, operating levers on said instrument panel, cables running from the opening mechanism of the gas tank cap lock and one of said hood locks to one of said operating levers, whereby the movement of said lever in one direction will open said gas cap lock and the movement of said lever in the opposite direction will open said hood lock, a cable running from the opening mechanism of the other hood lock to the other operating lever and cables running from the closing mechanism of all of said locks to said second-mentioned operating lever, whereby the movement of said lever in one direction will open said second-mentioned hood lock and the movement of said lever in the opposite direction will close all open locks.

THOMAS HOWARD GILL.